Nov. 27, 1928.
J. LAVERGNE
1,693,302
ROTARY MACHINE
Filed April 4, 1927
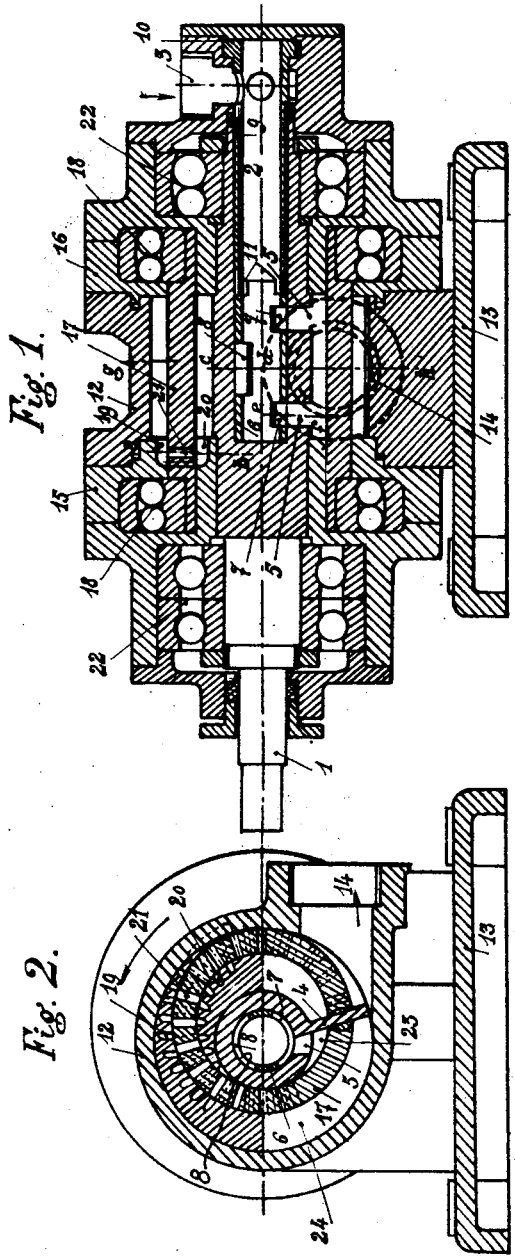
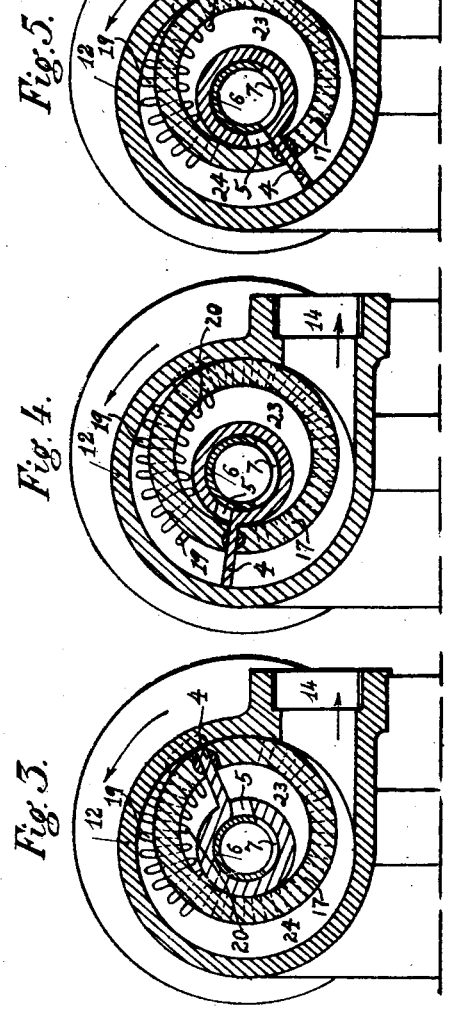
INVENTOR
Jean Lavergne
By William C. Linton
Attorney.

Patented Nov. 27, 1928.

1,693,302

UNITED STATES PATENT OFFICE.

JEAN LAVERGNE, OF PARIS, FRANCE, ASSIGNOR TO RENE FOREST, OF PARIS, FRANCE.

ROTARY MACHINE.

Application filed April 4, 1927, Serial No. 180,953, and in France April 7, 1926.

The present invention relates to machines having a continuous rotary motion which are employed as motors or as pumps, compressors or the like. It has for its object valve gear of an improved type, applicable to such machines of a known type comprising a central shaft which is provided with a radial wing and is mounted in the coaxial position in a stationary cylindrical casing provided with front sides which are traversed by the said wing shaft. The said wing extends through the wall of an eccentric ring, upon which it acts by means of curved bearing strips; said eccentric ring is tangent externally to the said cylindrical casing, and internally to the central shaft, and is rotatable in bearings which are mounted in the front sides of the cylindrical casing, and this forms two crescent-shaped chambers in the machine which are separated by the eccentric ring and in which the power fluid acts upon the said wing.

The fluid valve gear according to the invention is chiefly characterized, as compared with the known apparatus, by the fact that the elastic fluid, in the case of a motor, is admitted into in the interior of the central shaft which is hollow and is provided with inlet ports, by means of a sleeve provided with apertures for admission of the fluid and for balancing the internal pressure and also with a maintaining device by which the said sleeve will be automatically centered in the said shaft, thereby obviating all parasitic friction occasioned by a defective centering. Another feature of the invention consists in the fact that the two crescent-shaped chambers are connected together by holes in the rotatable eccentric ring and also by grooves in the front sides of the cylindrical casing. This fluid control by the use of apertures in the rotatable parts has the advantage of assuring a very fluidtight construction and also of eliminating all conduits formed in the front sides of the cylinder, and of allowing free space for mounting the supports for the rotatable parts, such as the ball bearings and the like.

The following description, with reference to the accompanying drawings which are given by way of example shows the valve gear according to the invention.

Fig. 1 is a longitudinal section of a motor comprising the valve gear in accordance with the invention.

Fig. 2 shows partial cross section on the lines $a$—$b$; $c$—$d$; $e$—$f$; $g$—$h$ of Fig 1. Figs. 3, 4 and 5 show the wing in different positions, illustrating the action of the elastic power fluid.

The driving shaft is indicated at 1; it is hollow for part of its length as shown at 2, and the power fluid enters through the inlet port 3. The hollow portion of the shaft 1 is provided with a wing 4 serving as a piston, and adjacent the said wing are two apertures 5. A stationary admission sleeve 6 is fitted in the shaft 1, and it comprises two ports 7 whose angle of opening determines the degre of admission; said ports are formed near the end of the sleeve and are so disposed as to offer communication for a fraction of a revolution with the respective ports 5 formed in the wing shaft. Since the pressure of the fluid in the admission sleeve 6 is unequally distributed, an additional port 8 is formed in the portion opposite the ports 7, to equilibrate the effect of the pressure. The sleeve 6 is accurately adjusted, and is not rigidly held by its supporting device, but is free to take a position concentric with the axis of the wing shaft without offering any resistance. For this purpose a tube 9 is engaged with a certain play in the hollow portion of the shaft 1 and is secured at one end to the stationary member 10 and at the other end it is engaged by the two extensions 11 in the sleeve 6 which it thus holds in a given angular position while allowing it all freedom to move radially so that the stationary valve sleeve 6 can thus be accurately adjusted and will offer no resistance, since there is no pressure between the friction parts.

The stationary cylindrical casing 12 is mounted on the base 13 and is provided at one side with an exhaust port 14. The ends of the casing 12 are closed by two front sides 15, 16 which are each provided at the center with an aperture for the insertion of the shaft 1. In the said casing is mounted a ring 17 whereof the external periphery is tangent to the internal wall of said casing and the internal periphery is tangent of the exterior of the shaft 1; said ring is fitted into grooves in the front sides 15, 16 and its ends are provided with collars to receive the ball bearings 18. The ring 17 is longitudinally slotted for the insertion of the wing 4 which is slidable by easy friction on three sides against the internal wall of the main body and draws with it the ring 17 in its rotation.

To provide communication between the interior and the exterior of the ring 17 at the proper time, a plurality of radial flow grooves 19, 20 are formed in the wall of one or both front sides 15, 16 and in the present construction, in the front side 15; said grooves can be placed in communication at the proper time by means of the holes 21 in the wall of the said eccentric ring. This feature enables the ring to be extended into the front sides 15, 16 as much as desired and to provide for the proper disposition of the ball bearing supports 18 and 22 respectively for the ring 17 and the shaft 1, since the conduits connecting the operating chambers used for the power fluid when at full pressure and when expanded will not be obliged to pass around the said supports.

The operation is as follows:

According to Figs. 1 and 2 the fluid enters the apparatus through the conduit 3, traverses the ports 7 and 5, and exercises its pressure in the portion of the small crescent 23 which is bounded by the cylinder, the shaft and the wing, and it accordingly rotates the said wing.

In Fig. 3 the valve gear is shown in the closed position. The volume of fluid under pressure which is admitted into the small crescent 23 is limited by the angle of opening of the valve element 2.

In Fig. 4, the fluid expands and continues its work in the small crescent 23; it passes through the grooves 20 and 19 and the holes of the rotary cylinder, and continues its work upon the wing in the large crescent 24.

In Fig. 5, the admission of the fluid under pressure again commences. The two crescents 23 and 24 are in full and constant communication.

Fig. 2 represents the position for the full admission and the commencement of the opening for the discharge. The two crescents 23 and 24 are always in full communication, as clearly shown.

It will be readily noted that the apparatus is reversible, and in fact, when rotating in the contrary direction it can be used as a compressor, in which the degree of opening of the ports of the stationary valve element will determine the ratio of the pressure between the suction and the delivery, which pressures may be above or below atmospheric pressure.

The aforesaid improvements are further applicable to rotary motors employing gas or carburetted air, to which are added a compressor and a motor.

Having so described my said invention and how it is performed, I declare that what I claim is:

1. In mechanism of the character set forth, the combination of a stationary cylinder, a concentric hollow shaft rotatable therein, a stationary sleeve in said shaft, and an eccentric tubular member rotatable within said cylinder and surrounding said shaft, said member having a longitudinal opening, said shaft having a vane extending through said opening into engagement with the wall of said cylinder, ports in the shaft and sleeve adapted to correspond in one position of rotation of said shaft, said sleeve having another port opposite to its first mentioned port, as and for the purpose described.

2. In mechanism of the character described, a stationary cylinder, an eccentric tubular member therein, a rotatable hollow shaft in said member concentric with said cylinder, a stationary sleeve in said shaft, said member having a longitudinal opening, said shaft having a vane extending through said opening to the wall of the cylinder, the shaft and sleeve having ports adapted to communicate in one position of rotation of the shaft, and means to floatingly engage said sleeve to prevent rotation thereof but to permit radial movement of same.

3. In mechanism of the character set forth, a stationary cylinder, an eccentric tubular member rotatable therein, a rotatable hollow shaft in said member concentric with said cylinder, said member having a longitudinal opening, said shaft having a vane extending through said opening to the wall of the cylinder, said cylinder having flow grooves in an end wall thereof intersected by said member, said member having holes for permitting communication between the intersected parts of the grooves, as and for the purpose set forth.

In testimony whereof I have signed my name to this specification at Paris this 23 day of March, 1927.

JEAN LAVERGNE.